J. R. WHITE.
VEHICLE COUPLING.
APPLICATION FILED MAR. 27, 1908.

935,134.

Patented Sept. 28, 1909.
2 SHEETS—SHEET 1.

Witnesses
J. H. Crawford
F. G. Smith

Inventor
Joseph R. White,

By Chandler & Chandler
Attorneys

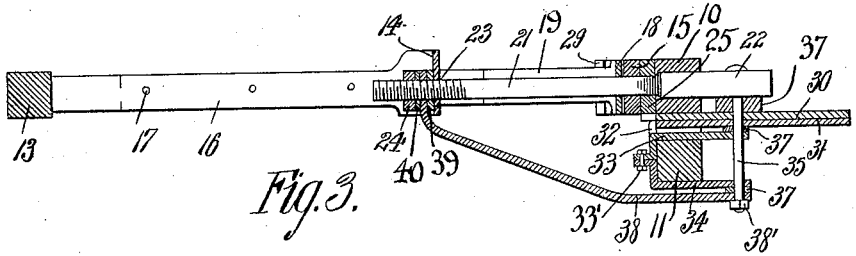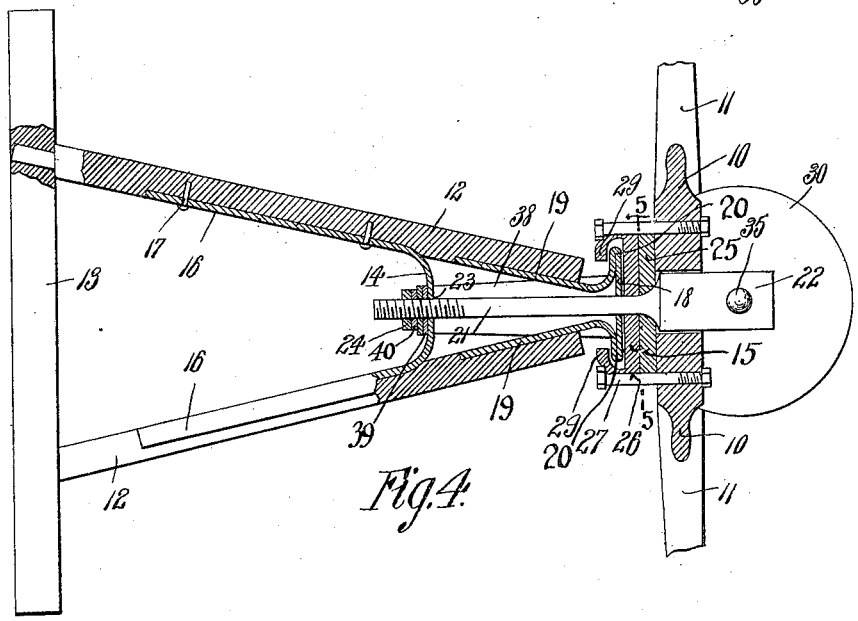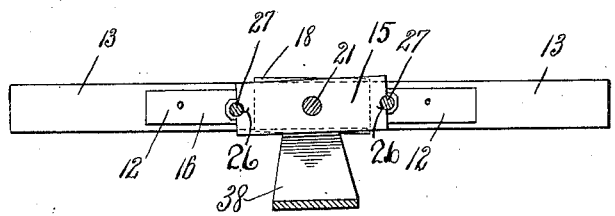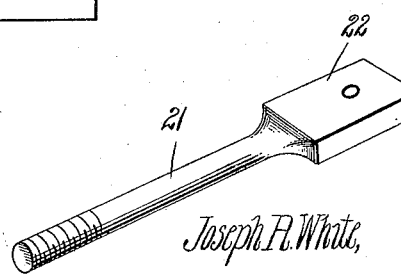

UNITED STATES PATENT OFFICE.

JOSEPH R. WHITE, OF SCROGGINS, TEXAS.

VEHICLE-COUPLING.

935,134.  Specification of Letters Patent.  Patented Sept. 28, 1909.

Application filed March 27, 1908. Serial No. 423,749.

*To all whom it may concern:*

Be it known that I, JOSEPH R. WHITE, a citizen of the United States, residing at Scroggins, in the county of Franklin, State of Texas, have invented certain new and useful Improvements in Vehicle-Couplings; and I do hereby declare the following to be a full, clear, and exact description of the invention, such as will enable others skilled in the art to which it appertains to make and use the same.

This invention relates to vehicle couplings, and more particularly to that class which serve to connect the front bolster and hounds of a vehicle.

The object of the invention is to provide a coupling of this class which will permit of travel of the vehicle over rough roads without the running gear being injured or broken due to the additional strain placed upon it, incident to such travel.

In carrying out my invention I have aimed so to construct the coupling that the usual turning movement of the axle will not be interfered with in the slightest degree, and in which the hounds and bolster will be as securely connected as if rigid with respect to each other, the only movement possible being a rocking movement of the bolster relatively to the hounds.

Figure 1:
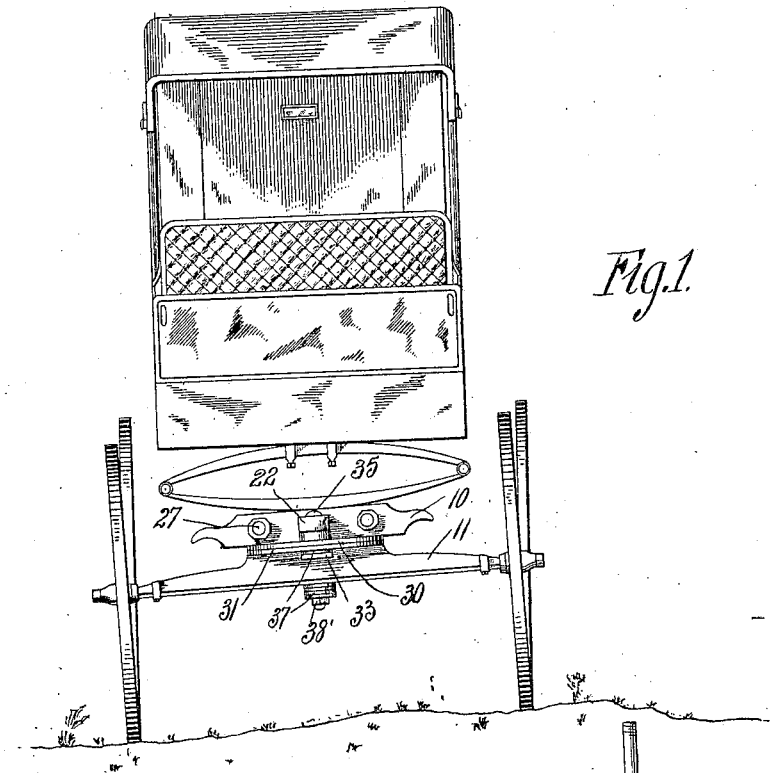
Figure 2:
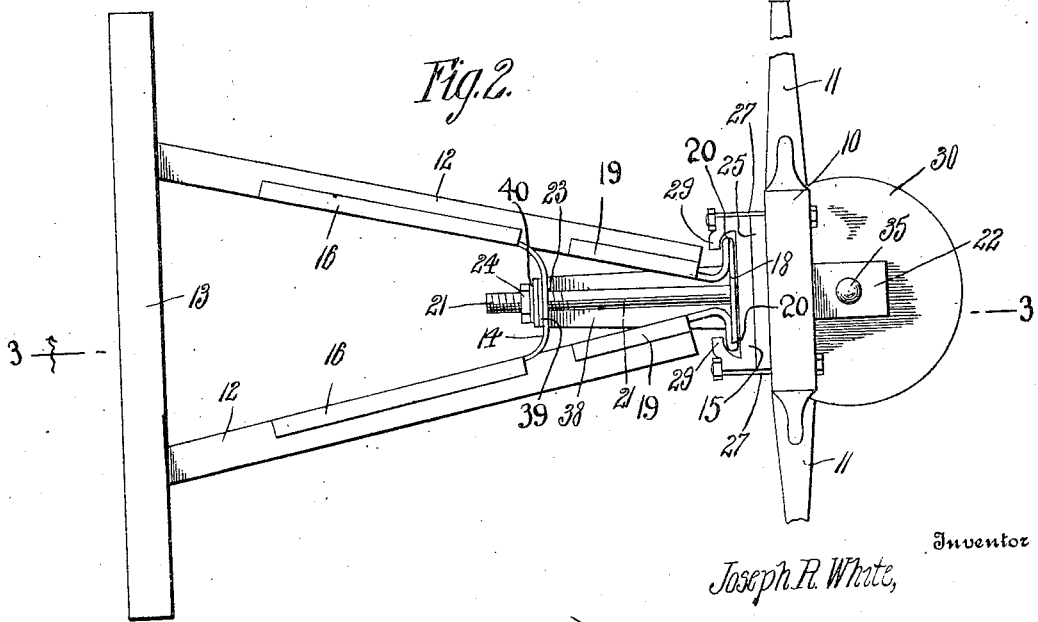

In the accompanying drawings, Figure 1 is a front elevation of a vehicle illustrating the manner in which the bolster and front axle may rock with respect to the body of the vehicle. Fig. 2 is a top plan view of the hounds, bolster and other related parts, Fig. 3 is a vertical longitudinal sectional view taken on the line 3—3, Fig. 2. Fig. 4 is a top plan view, partly in section. Fig. 5 is a vertical transverse sectional view taken on the line 5—5, Fig. 4 and looking in the direction of the arrow thereon, and showing in dotted lines the position assumed by certain parts when the front axle is rocked, and, Fig. 6 is a detail perspective view of a portion of the coupling.

In the drawings, 10 designates generally the front bolster of the vehicle, 11 the front axle, and 12 the front hounds, the latter being mounted beneath the bed of the vehicle as usual, and having their rear ends rigidly connected with a sill 13, and their forward ends rotatably connected with the bolster 10 by means hereinafter described.

The forward ends and intermediate portions of the hounds are connected and braced by means of the bearings which are provided for the coupling bolt of the device. The intermediate bearing comprises a head 14 through which the coupling bolt is passed as will be presently fully explained, and extending rearwardly from the head in diverging planes are channeled attaching arms 16 to receive the intermediate and rear portions of the hounds in which the latter are held by bolts 17. The forward bearing for the coupling bolt comprises a head 18 at the ends of which are formed rearwardly diverging channeled attaching arms 19 to receive the forward ends of the hounds which are held therein in any suitable manner. The coupling bolt to which reference has been made comprises a shank 21 at the forward end of which is formed a flat head 22 which is passed through the bolster 10 and projects forwardly therebeyond, the shank of the bolt being extended rearwardly from the said bolster and through opening 23 formed in the head 14 and a registering opening formed in the head 18. The shank 21 of the bolt is threaded at its rear end and has a nut 24 mounted thereon for the purpose of holding the bolt against longitudinal play in its bearings.

It will be observed from the drawings that the flanges of the arms of the intermediate bearing for the coupling bolt terminate short of the head 14 thus to adapt the latter to constitute one member of a swivel connection between the hounds and the bolster, the other member of which is composed of the forward bearing embodying the arms 19 and the head 18. The coupling between the hounds and the bolster comprises a plate 15 which is formed at each end with a seat 26 for the shanks of the bolts 27 which are passed through the bolster 10 and serve to hold the plate assembled with the bolster, there being a liner 25 interposed between the bolster and the plate. The plate is formed at each of its ends and upon its rear face with a cleat 29, the two cleats being projected toward each other and are spaced with respect to the rear face of the plate thereof. The projecting ends 20 of the head 18 of the forward bearing work between the plate 15 and the cleats 29 as clearly shown in Fig. 2 which cleats 29 constitute keepers, as it will be obvious that the coaction between the cleats and head 18 will serve not only to relieve the coupling bolt 21 from strains that would tend to withdraw it from the heads 14 and 18, but that the connection serves effectually to swivel the hounds to the bolster in connection with the head 14 and stem 21.

Secured to the under side of the bolster 10 is one member 30 of the fifth wheel of the vehicle, the other member 31 of which is secured to the upper face of the axle 11 and is formed at its rear edge with ears 32 bent downwardly against the rear face of the axle. A plate 33 is seated in a recess formed in the upper face of the axle 11 and projects at its ends forwardly and rearwardly beyond the axle, and a similar plate 34 is disposed against the under side of the axle, there being a king bolt 35 passed through the head 22 of the coupling bolt, the members 30 and 31 of the fifth wheel of the vehicle, and the ends of the plates 33 and 34 which project forwardly beyond the axle. The rear end portions of the plates 33 and 34 are bent to extend vertically of the rear of the axle 11 and then rearwardly in mutual contact, these rearwardly extended portions being perforated and receiving the clamping bolt 33' as illustrated. To obviate binding between the parts, three washers 37 are arranged upon the bolt 35, one of which is disposed between the upper member 30 of the fifth wheel and the head 22 of the coupling bolt, the second between the plate 33 and the under member 31 of the fifth wheel, and the third between the lower plate 34 and the forward end of a brace 38 which is disposed beneath the axle and through which the bolt 35 passes, there being a nut 38' threaded upon the bolt beneath the brace to hold the bolt in position. The brace 38 is extended rearwardly and upwardly and has its rear end upturned and formed with an opening through which the coupling bolt 21 passes, there being a washer 39 disposed between the upturned end and the head 14 of the rear bearing and a second washer 40 interposed between this upturned end and the nut 24. The brace 38, as will be readily understood, serves to stay the axle with respect to the hounds and further aids in preventing accidental withdrawal of the bolt from the heads 14 and 18.

From the foregoing description, it will be seen that there is provided a connection of the class described in which, while all of the parts are firmly braced, is of such nature as to permit of turning movement of the axle and its supporting bolster relatively to the hounds. It will also be observed that as far as possible any likelihood of the coupling bolt 21 becoming accidentally withdrawn from its bearing is obviated.

I claim:

1. In a coupling of the class described, the combination with the hounds and front bolster of a vehicle, of front and rear bearings connecting and bracing the hounds, a coupling bolt non-rotatably connected with the bolster and extended through the bearings, and a swivel connection between the bolster and front bearing and comprising a member which is attached to the bolster and in which a portion of the front bearing works.

2. In a coupling of the class described, the combination with the hounds and front bolster of a vehicle, of front and rear bearings connecting and bracing the hounds, a coupling bolt formed with a head that is passed through the bolster, the shank of the bolt being extended through the bearings, a strap passed beneath the axle of the vehicle and engaged at its rear end with the like end of the coupling, a king bolt passed through the forward end of the strap, the head of the coupling bolt and the fifth wheel of the vehicle, and a swivel connection between the bolster and the front bearing.

3. In a coupling of the class described, the combination with the hounds and front bolster of a vehicle, of front and rear bearings connecting and bracing the hounds, the front bearing being provided with lateral extensions, a coupling bolt non-rotatably connected with the bolster and extended through the bearings, and a member secured to the bolster and provided with keepers to hold the lateral extensions of the front bearing rotatably connected with the member to secure a swivel connection between the bolster and the front bearing.

In testimony whereof, I affix my signature, in presence of two witnesses.

JOSEPH R. WHITE.

Witnesses:
R. T. WILKINSON,
F. J. JOYCE.